(12) United States Patent
    Mizrachi

(10) Patent No.: US 9,456,941 B2
(45) Date of Patent: Oct. 4, 2016

(54) TROLLEY FOR TRANSPORTING INDIVIDUALS OF LIMITED CAPACITY IN SEDENTARY POSITION ON CHAIR

(75) Inventor: David Mizrachi, Tiberias, IL (US)

(73) Assignee: David Mizrachi, Tiberias, IL (US)

( * ) Notice: Subject to any disclaimer, the term of this patent is extended or adjusted under 35 U.S.C. 154(b) by 0 days.

(21) Appl. No.: 13/816,284

(22) PCT Filed: Aug. 11, 2011

(86) PCT No.: PCT/IL2011/000655
§ 371 (c)(1),
(2), (4) Date: Apr. 10, 2013

(87) PCT Pub. No.: WO2012/020414
PCT Pub. Date: Feb. 16, 2012

(65) Prior Publication Data
US 2013/0270794 A1     Oct. 17, 2013

Related U.S. Application Data

(60) Provisional application No. 61/372,467, filed on Aug. 11, 2010.

(51) Int. Cl.
| | |
|---|---|
| *A61G 5/00* | (2006.01) |
| *A61G 5/10* | (2006.01) |
| *A61G 5/04* | (2013.01) |
| *B62B 5/00* | (2006.01) |
| *A61G 5/08* | (2006.01) |

(52) U.S. Cl.
CPC . *A61G 5/00* (2013.01); *A61G 5/04* (2013.01); *A61G 5/10* (2013.01); *A61G 5/1002* (2013.01); *B62B 5/0093* (2013.01); *A61G 5/1013* (2013.01); *A61G 2005/0875* (2013.01); *B62B 2202/32* (2013.01); *B62B 2202/42* (2013.01)

(58) Field of Classification Search
CPC ...... A61G 5/00; A61G 5/10; A61G 2203/80; A61G 12/008; A61G 2005/0875; A61G 2202/32
USPC ........... 280/47.11, 47.34, 47.38, 47.39, 47.4, 280/79.2, DIG. 11
See application file for complete search history.

(56) References Cited

U.S. PATENT DOCUMENTS

| | | | | |
|---|---|---|---|---|
| 1,953,179 | A | * | 4/1934 | Kingston ........................ 192/90 |
| 2,726,097 | A | * | 12/1955 | Kirkpatrick ................ 280/455.1 |
| 3,802,524 | A | * | 4/1974 | Seidel ............................ 180/6.5 |
| 3,918,106 | A | | 11/1975 | Hellqvist |
| 3,945,449 | A | | 3/1976 | Ostrow |
| 4,566,707 | A | | 1/1986 | Nitzberg |
| 4,575,113 | A | * | 3/1986 | Boudreau ..................... 280/650 |

(Continued)

OTHER PUBLICATIONS

International Search Report and Written Opinion dated Jan. 25, 2012 in co-pending International Application No. PCT/IL2011/000655.

*Primary Examiner* — Bryan Evans
(74) *Attorney, Agent, or Firm* — Avery N. Goldstein; Blue Filament Law LLC

(57) ABSTRACT

A trolley for transporting individuals of limited capacity in a sedentary position on a chair is disclosed. The aforesaid trolley comprises (a) a carrying structure and (b) at least three wheels rotatably secured to the structure within a perimeter thereof. The carrying structure is configured for releasably fixating legs of the chair such that the chair is reversibly mountable on the carrying structure.

18 Claims, 10 Drawing Sheets

(56) References Cited

U.S. PATENT DOCUMENTS

| | | |
|---|---|---|
| 4,605,267 A | 8/1986 | Rinkewich |
| 4,773,494 A | 9/1988 | Anderson |
| 5,028,059 A | 7/1991 | Baker |
| 5,183,133 A * | 2/1993 | Roy et al. .................... 180/252 |
| 5,255,934 A | 10/1993 | Wilson |
| 6,213,558 B1 | 4/2001 | Axelson et al. |
| 6,217,057 B1 * | 4/2001 | Kitchen et al. ............... 280/650 |
| 2002/0020987 A1 | 2/2002 | Coleman |
| 2003/0123616 A1 | 7/2003 | Jackson, Sr. |
| 2004/0195803 A1 | 10/2004 | Brown |
| 2006/0247504 A1 | 11/2006 | Tice |
| 2008/0048411 A1 | 2/2008 | Haury et al. |
| 2009/0085317 A1 * | 4/2009 | Livengood et al. ......... 280/79.3 |
| 2009/0152827 A1 | 6/2009 | Freitas Silva et al. |

\* cited by examiner

TROLLEY FOR TRANSPORTING INDIVIDUALS OF LIMITED CAPACITY IN SEDENTARY POSITION ON CHAIR

FIELD OF THE INVENTION

The present invention relates to equipment for facilitating life-sustaining activity of individuals of limited capacity, and, more specifically, to a trolley for transporting individuals of limited capacity in a sedentary position on a chair.

BACKGROUND OF THE INVENTION

A wheelchair is a wheeled mobility device in which the user sits. The device is propelled either manually (by turning the wheels by the hand) or via various automated systems. Wheelchairs are used by people for whom walking is difficult or impossible due to illness (physiological or physical), injury, or disability.

A basic standard manual wheelchair incorporates a seat and back support, two small front (caster) wheels and two large wheels, one on each side, and a foot rest. Wheelchairs are often variations on this basic design, but there are many types of wheelchairs, and they are often highly customized for the individual user's needs. The seat size (width and depth), seat-to-floor height, footrests/leg rests, front caster outriggers, adjustable backrests, controls, and many other features can be customized on, or added to, many basic models, while some users, often those with specialized needs, may have wheelchairs custom-built.

Various optional accessories are available, such as anti-tip bars or wheels, safety belts, adjustable backrests, tilt and/or recline features, extra support for limbs or neck, mounts or carrying devices for crutches, walkers or oxygen tanks, drink holders, and clothing protectors.

US Patent Application 2008/0048411 discloses a collapsible, foldable support structure and conveyance having a frame assembly with multiple interconnected frame members, junction blocks located at intersecting ends of some of the frame members, and wheels attached to the junction blocks or directly to frame members. Fixtures are attached to or integrally formed with the junction blocks for mounting of wheels or other conveyances or components to the frame assembly. A support structure is attached to the frame assembly to support a load such as a human or cargo or both. In a folded configuration, the frame members are moved into a generally parallel arrangement and the junction blocks and conveyances attached to the junction blocks or frame members are drawn together.

The disclosed technical solution provides a conveyance for individuals of limited capacity. It should be emphasized that collapsibility of the disclosed device is limited and takes a good deal of room. It is very promising to use an available at home or a hospital a standard chair for transporting the individuals of limited capacity to an object of interest or facilitating life-sustaining activity. Thus, there is an unmet and long-felt need to provide a device that is able to safely transport the individuals in a sedentary position on a standard chair. If this device is collapsible, it occupies less room and is much more convenient.

SUMMARY OF THE INVENTION

It is hence one object of the invention to disclose a trolley for transporting individuals of limited capacity in a sedentary position on a chair. The aforesaid trolley comprises (a) a carrying structure and (b) at least three wheels rotatably secured to the structure within a perimeter thereof.

It is a core purpose of the invention to provide the carrying structure configured for releasably fixating legs of the chair such that the chair is reversibly mountable on the carrying structure.

Another object of the invention is to disclose chair seat and back support upholstered with a water-proof material.

A further object of the invention is to disclose the trolley having following dimensional specifications: a length ranged between 110 and 120 cm; a width ranged between 75 and 85 cm; and a height ranged between 10 and 30 cm;

A further object of the invention is to disclose the carrying structure further comprising a holder adapted to hold an object selected from the group consisting of an infusion bag, an oxygen balloon, a basket, a medical monitor, a sunshade, and any combination thereof.

A further object of the invention is to disclose the medical monitor adapted to sense at least one user's parameter selected from the group consisting of heart electrical activity, breath activity, heart beat, blood pressure, haematological parameters and combination thereof.

A further object of the invention is to disclose the monitor adapted to sense said haematological parameters noninvasively.

A further object of the invention is to disclose the trolley configured as a mobility-aiding device.

A further object of the invention is to disclose the trolley configured as a walking frame.

A further object of the invention is to disclose the trolley comprising propelling means further comprising (a) a motor; (b) a wheel for contacting the ground, the wheel mechanically connected to the motor; and (c) controlling means adapted to translate user's steering commands.

A further object of the invention is to disclose the propelling means rotatably mounted onto the trolley such that a direction of trolley movement is controlled by rotation of the propelling means.

A further object of the invention is to disclose the propelling means mounted onto the trolley in a geometrical center thereof.

A further object of the invention is to disclose the trolley provided with a handle adapted for manually pushing/tugging thereof.

A further object of the invention is to disclose the chair legs releasably fixated by fixating means selected from the group consisting of a spring catch, a clamp, a clip, a lock, a grasp, a gripper, a latch, a cleat, a lug, a fixture, a holdfast, a jam, a nip, a checker, a fastener, and any combination thereof.

A further object of the invention is to disclose the trolley made of a metal alloy, wood, a polymeric material, and any combination thereof.

A further object of the invention is to disclose the trolley being transparent for X-rays.

A further object of the invention is to disclose the trolley comprising predetermined modules. The modules are adapted to be assembled or disassembled manually at the site of use.

A further object of the invention is to disclose the constituent parts coupled to each other by means for releasably locking selected from the group consisting of catch, a clamp, a clip, a lock, a grasp, a gripper, a latch, a cleat, a lug, a fixture, a holdfast, a jam, a nip, a checker, a fastener, and any combination thereof.

A further object of the invention is to disclose a wheel chair for facilitating life-sustaining activity of individuals of limited capacity. The aforesaid chair comprises (a) a trolley further comprising (i) a carrying structure; and (ii) wheels rotatably secured to the structure; (b) a chair structure having a seat and a back support.

It is a core purpose of the invention to provide the chair structure releasably secured to the carrying structure.

A further object of the invention is to disclose the wheel chair provided with toilet means adapted to receiving, storing, transporting and decomposing a fecal matter.

A further object of the invention is to disclose a method of facilitating life-sustaining activity of individuals of limited capacity. The aforesaid method comprises the steps of: (a) providing a trolley for transporting individuals of limited capacity in a sedentary position on a chair further comprising: (i) a carrying structure and (ii) at least three wheels rotatably secured to the structure within a perimeter thereof; the carrying structure is configured for releasably fixating legs of the chair such that the chair is reversibly mountable on the carrying structure; (b) providing a chair; (c) mounting the chair onto the trolley; (d) releasably fixating the chair legs within spring catches; (e) placing the individual onto the chair; and (f) facilitating life-sustaining activity of the individual.

A further object of the invention is to disclose the said step of facilitating life-sustaining activity further comprising transporting said individuals to an object of interest, outing, performing medical tests, including X-ray examination, hygienic procedures, including toilet, and any combination thereof.

A further object of the invention is to disclose the chair provided at said step (b) is characterized by seat and back support upholstered with a water-proof material.

A further object of the invention is to disclose the carrying structure provided with a holder adapted to hold an object selected from the group consisting of an infusion bag, an oxygen balloon, a basket, a medical monitor, a sunshade, and any combination thereof.

A further object of the invention is to disclose the medical monitor adapted to sense at least one user's parameter selected from the group consisting of heart electrical activity, breath activity, heart beat, blood pressure, haematological parameters and any combination thereof.

A further object of the invention is to disclose the provided trolley that is configured as a mobility-aiding device.

A further object of the invention is to disclose the trolley provided with propelling means comprising (a) a motor; (b) a wheel for contacting the ground, the wheel mechanically connected to the motor; and (c) controlling means adapted to translate user's steering commands.

A further object of the invention is to disclose the motor that is electrical.

A further object of the invention is to disclose the motor driven by compressed fluid.

A further object of the invention is to disclose the said trolley provided with propelling means rotatably mounted onto the trolley such that a direction of trolley movement is controlled by rotation of the propelling means.

A further object of the invention is to disclose the trolley provided with the propelling means mounted onto the trolley in a geometrical center thereof.

A further object of the invention is to disclose the trolley provided with a handle adapted for manually pushing/tugging thereof.

A further object of the invention is to disclose the said chair legs releasably fixated by fixating means selected from the group consisting of a catch, a clamp, a clip, a lock, a grasp, a gripper, a latch, a cleat, a lug, a fixture, a holdfast, a jam, a nip, a checker, a fastener, and any combination thereof.

A further object of the invention is to disclose the trolley made of a metal alloy, wood, a polymeric material, and any combination thereof.

A further object of the invention is to disclose the provided trolley that is transparent to X-rays.

A further object of the invention is to disclose the provided trolley comprising predetermined modules. The modules are adapted to be assembled or disassembled manually at the site of use.

A further object of the invention is to disclose the constituent parts coupled to each other by means for releasably locking selected from the group consisting of a catch, a clamp, a clip, a lock, a grasp, a gripper, a latch, a cleat, a lug, a fixture, a holdfast, a jam, a nip, a checker, a fastener, and any combination thereof.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a trolley for transporting individuals of limited capacity in a sedentary position on a chair and a method of facilitating life-sustaining activity of individuals of limited capacity.

The proposed technical solution corresponds to FDA classification Class I, CFR 890.3850. Technical requirements to wheelchairs that embodied in the standard family ISO 7176 are met.

Figure 1:
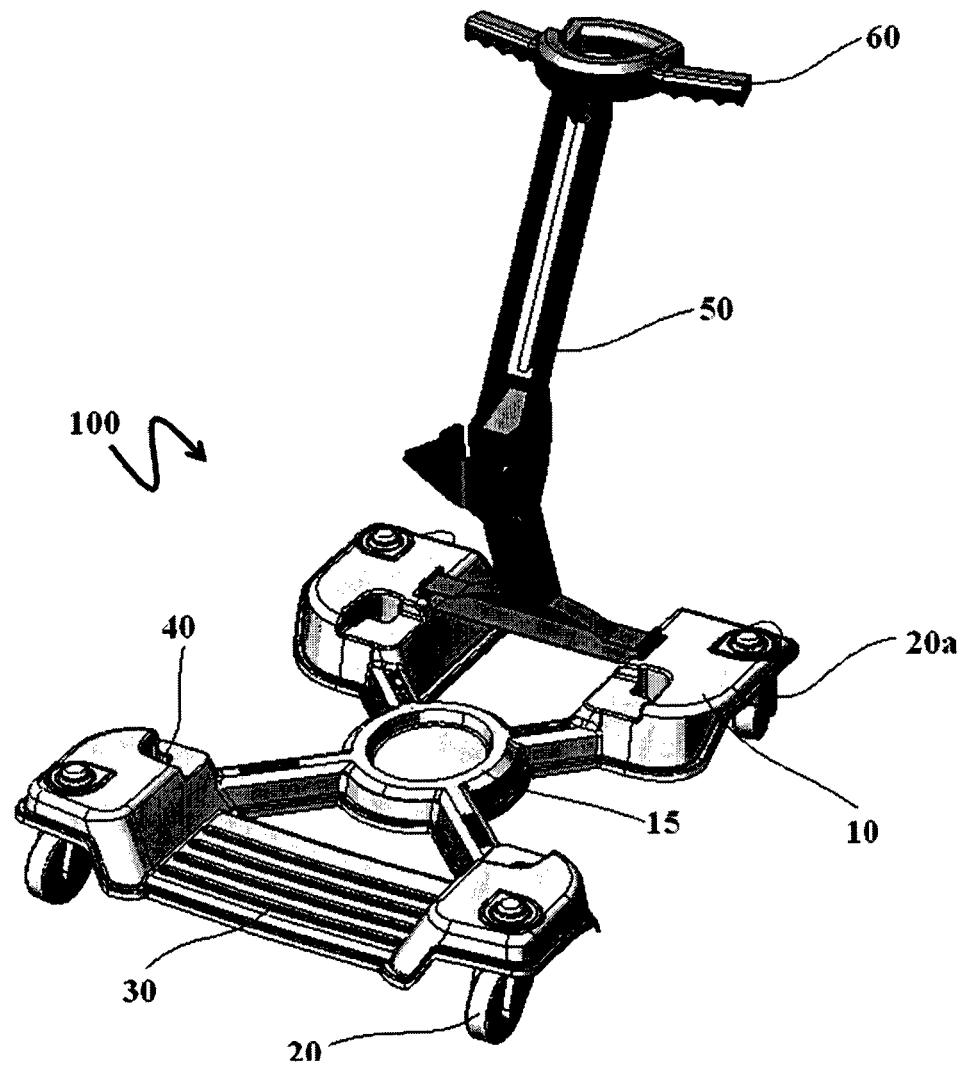
FIG. 1 is an isometric schematic view of the trolley.

Reference is now made to FIG. 1, presenting a trolley 100 for transporting individuals of limited capacity in a sedentary position on a chair. Optionally, the trolley 100 unlimitedly includes mounting pads 10, front wheels 20, rear wheels 20a provided with brakes, spring catches, a central part 15, a steering column 50 provided with handles 60. A footboard 30 is adapted for supporting patient's legs. In accordance with a preferable embodiment of the current invention, the trolley 100 is designed for reliably fixating and carrying a chair adapted for supporting an individual in a sedentary position. The central part 15 can be provided with the wheel 20 (not shown).

The trolley is optionally provided with a holder adapted to hold an object selected from the group consisting of an infusion bag, an oxygen balloon, a basket, a sunshade, and any combination thereof.

Figure 2:
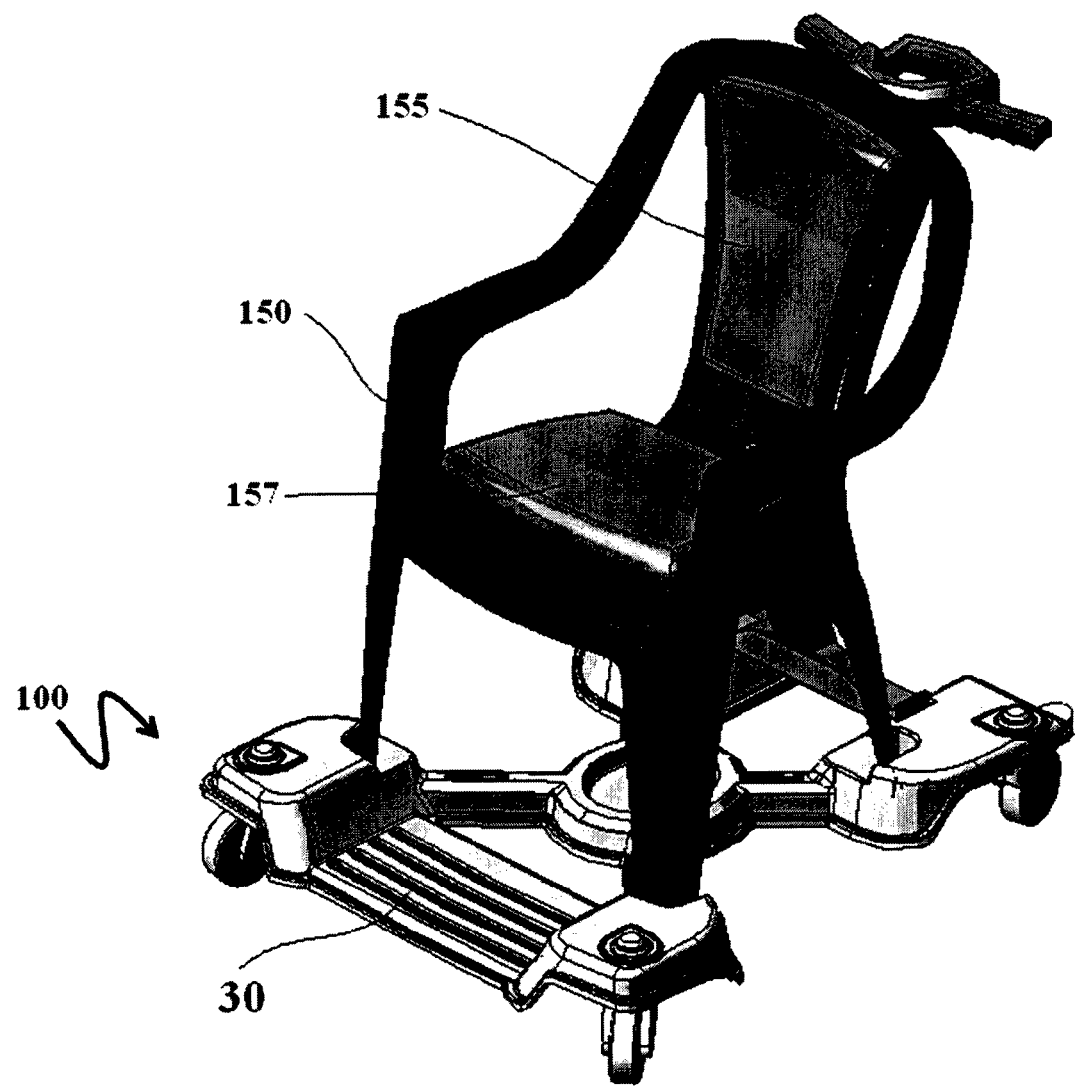
FIG. 2 is an isometric schematic view of the trolley provided with a chair secured to the trolley.

Reference is now made to FIG. 2, showing a chair 150 fixated onto the trolley 100. In accordance with one of embodiment of the invention, a seat 155 and a back support 157 are upholstered with a water-proof material. The seat 155 and the back support 157 are adapted for long sitting due to upholstering thereof with sufficiently elastic material. The seat 155 and the back support 157 at least partially inflatable are in the scope of the current invention.

Figure 3:
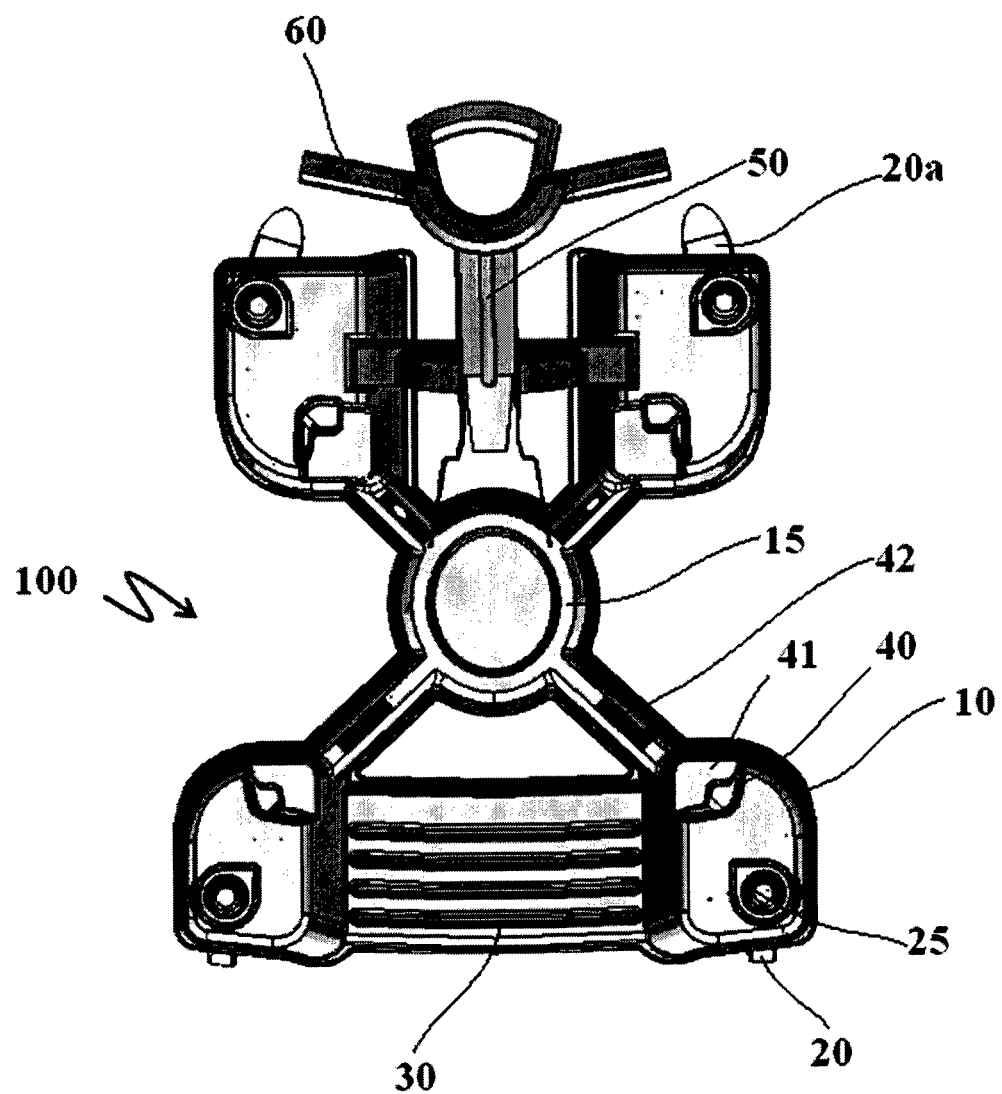
FIG. 3 is a top view of the trolley.
Figure 4:
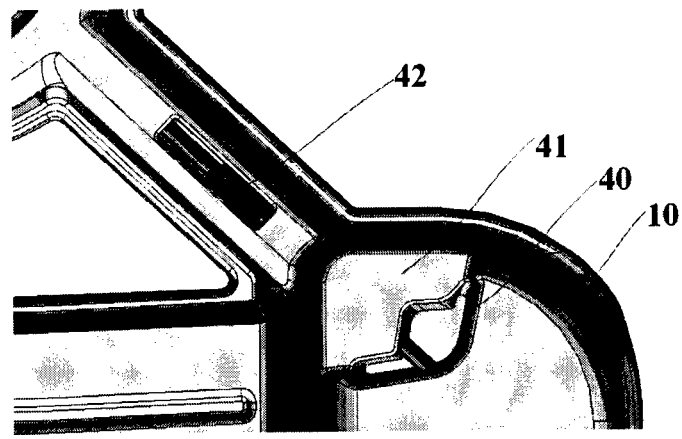
FIGS. 4 and 5 are schematic views of the spring catch in the closed and open positions, respectively.
Figure 5:
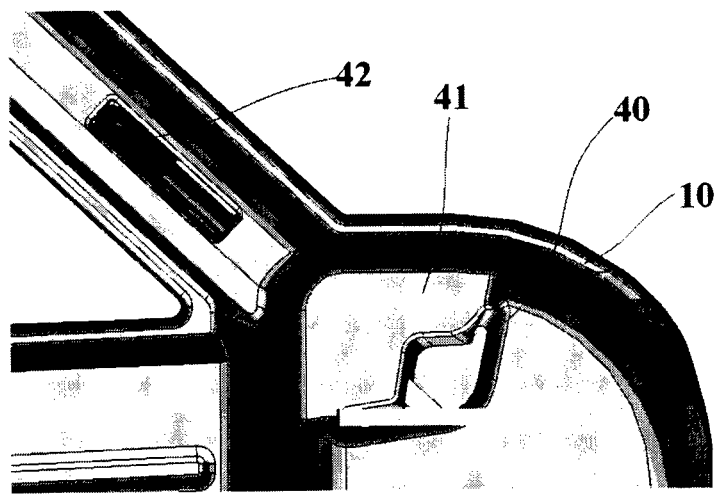

Reference is now made to FIGS. 3, 4 and 5, presenting a top view of the trolley 100. Spring catches 40 are adapted to reliably fixate the chair legs (not shown). Each spring catch comprises a sprung lock plate 41 and a control button 42. Specifically, FIGS. 4 and 5 shows the catch 40 in closed and open positions. As seen in FIG. 4, the sprung lock plate 41 fixates the chair leg. In FIG. 5, the lock plate 41 is taken away by means of the control button 42.

Figure 6:
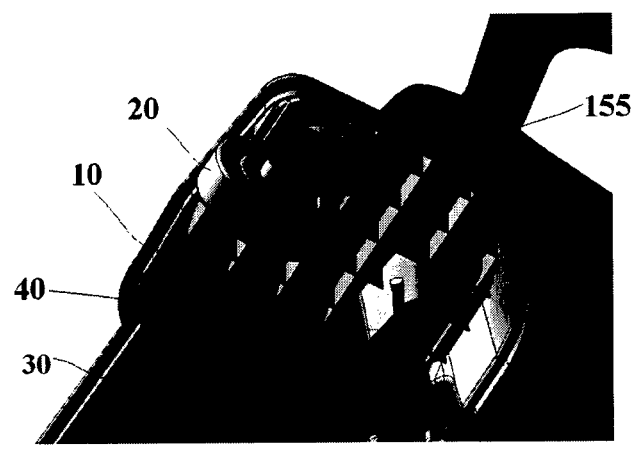
FIG. 6 is a bottom view of the spring catch.

Reference is now made to FIG. 6, showing the spring catch 40 is an enlarged manner. As seen in FIG. 6, a chair leg 155 is inserted from above and releasably fixated in the aforesaid spring catch 40.

Figure 7:
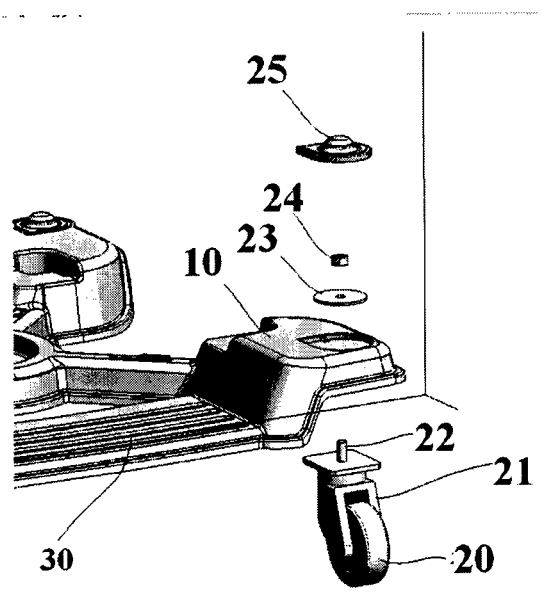
FIG. 7 is an exploded view of wheel mounting.

Reference is now made to FIG. 7, presenting a mounting arrangement of the wheel 20. The aforesaid mounting arrangement comprises a fork 21 provided with a fulcrum pin 22 which is partially. The fork 21 is secured to the mounting pad 10 by means of a spacer 23 and a nut 24. Thus, the wheel is rotatably mounted onto the mounting pad 10. As shown in FIGS. 1 and 2, free rotation of the wheels 20 enables the trolley to unlimitedly maneuver.

Figure 8:
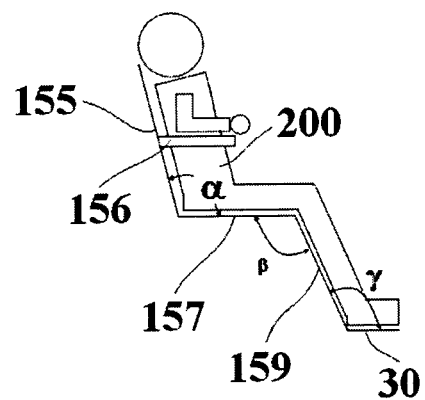
FIG. 8 is a geometric scheme of a wheelchair.

Reference is now made to FIG. 8, presenting a geometric arrangement of chair whereon a user 200 is sitting. Numerals 155, 157, 159 and 30 indicate a back support, a seat, a leg support 159 and a foot support 30. The geometric arrangement is defined by angles $\alpha$, $\beta$ and $\gamma$, where $\alpha$ is an angle between the back support 155 and the seat 155, $\beta$ is an angle between the seat 155 and the leg support 159, $\gamma$ is an angle between the leg support 159 and the foot support 30. In accordance with another embodiment of the current invention, the back support 155 is provided with a brace adapted to support a user's body 200. The aforesaid disclosed embodiment is useful for patients with cerebral palsy and or any other disease causing motor impairment and mechanical instability.

According to the operating standards, the aforesaid wheel chair is characterized by following parameters: a height of a footboard over the ground ranged between about 10 and about 30 cm; a height of a chair seat over the ground ranged between about 45 and about 55 cm; a seat-to-back-support angle $\alpha$ ranged between about 90 and about 180 degrees, a seat-to-leg support angle $\beta$ ranged between about 90 and about 180 degrees, a leg-support-to-foot-support angle $\gamma$ ranged between about 90 and about 130 degrees.

Figure 9:
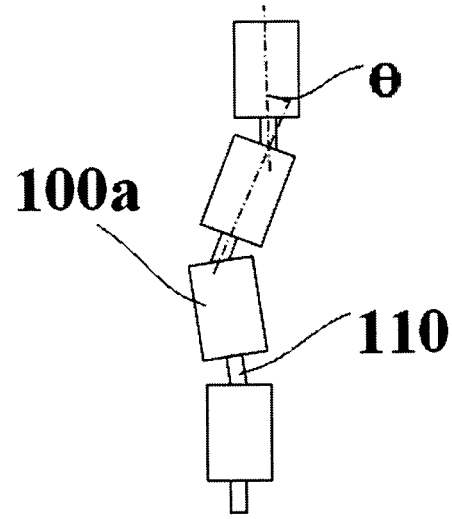
FIG. 9 is a schematic view of the trolleys grouped for towing.

Reference is now made to FIG. 9, presenting trolleys 100a grouped in sequence for towing. The trolleys are individually provided with coupling device 110. The aforesaid device is adapted to constraint an angle $\theta$ between said trolleys in sequence and prevent the trolley sequence from misrouting in reverse.

Figure 10A:
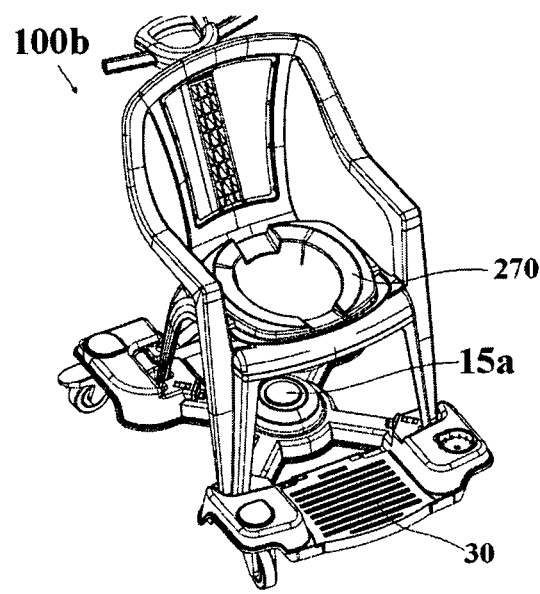
FIGS. 10a and 10b are isometric schematic views of a wheelchair providing with a toilet receptacle.
Figure 10B:
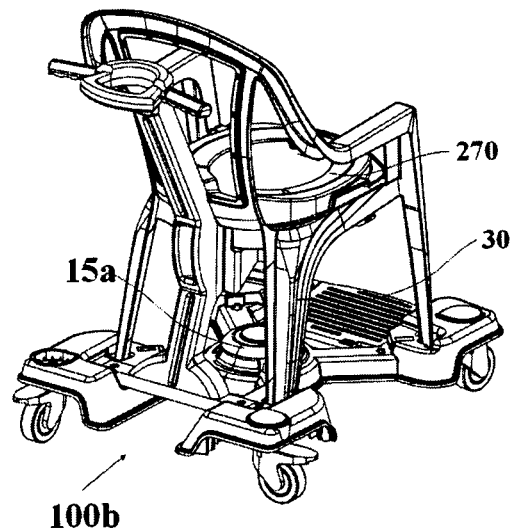

Reference is now made to FIGS. 10a and 10b, presenting a wheel chair 100b provided with a toilet arrangement 270 (as specified below). For convenience of nursing staff, the receptacle 160 is releasably connected to the chair and can be changed as needed. A central part 15a is provided with a wheel (not shown).

Figure 11A:
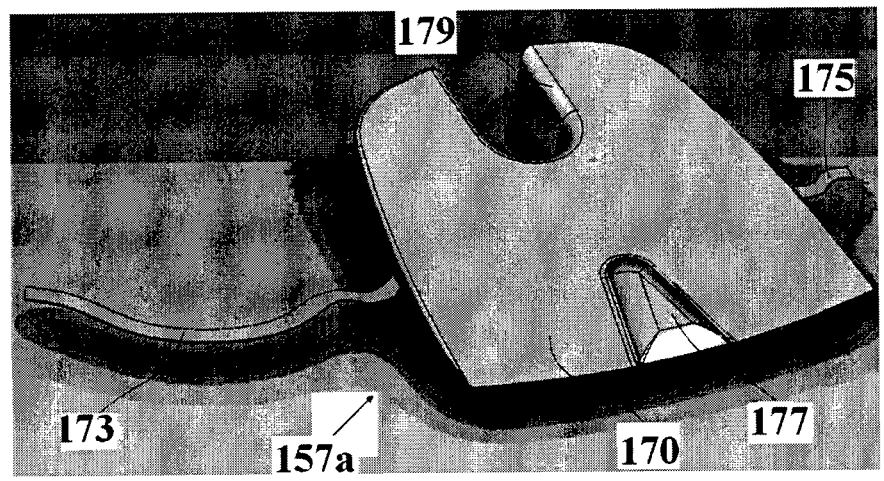
FIGS. 11a and 11b are schematic views of specific embodiments of the seat and the back support.

Reference is now made to FIG. 11a, presenting a seat cushion 155a adapted for convenient use of the toilet receptacle 160 (not shown). The seat 155 comprises recesses 177 and 179 for convenient urination and defecation, respectively. Cords 173 and 175 are provided for easy fixation of the seat 155a to the chair 100b.

Figure 11B:
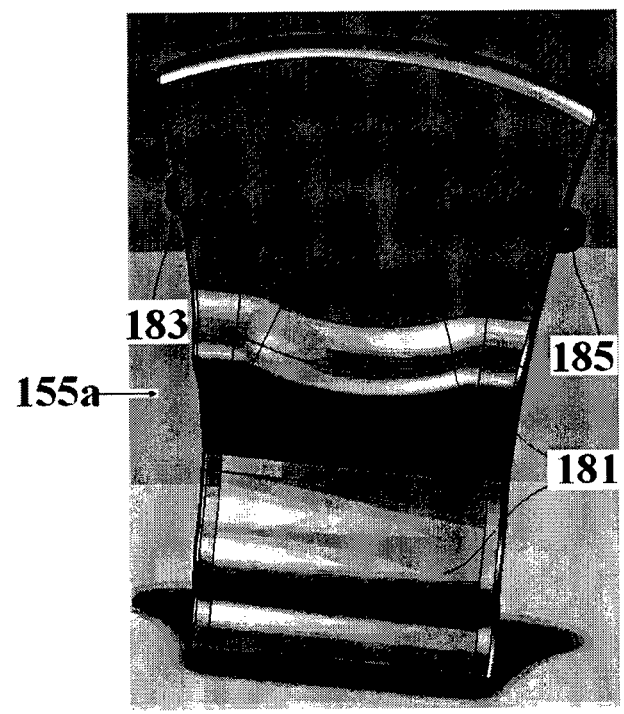

Reference is now made to FIG. 11b, presenting a back support cushion 157a which is attachable to the chair 100b. Relief elements 181 are designed for preventive care against of back pain of the patients. Cords 183 and 185 are provided for easy fixation of the seat 157a to the chair 100b.

The parts 155a and 157a are made of an elastic material and adapted to prevent the user from creation of pressure ulcers.

Figure 12:
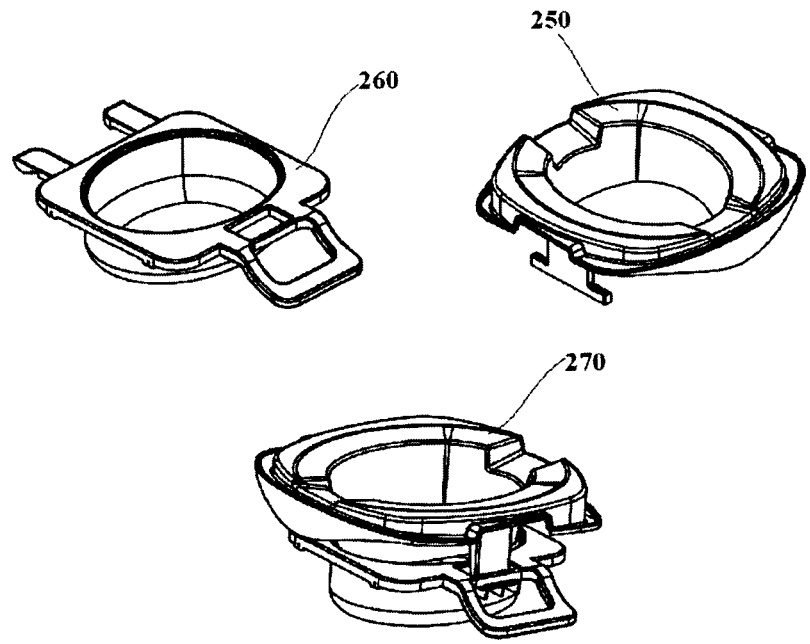
FIG. 12 presents isometric views of a toilet seat, a toilet receptacle and a combination thereof.

Reference is now made to FIG. 12, presenting a seat 250, a toilet receptacle 260 and a toilet arrangement 270 constituting the seat 250 and receptacle 260 combined therebetween. In accordance with a preferred embodiment of the current invention, the receptacle 260 is releasably connected to the seat 250. Additionally, the toilet receptacle 260 is disposable (single use).

Figure 13:
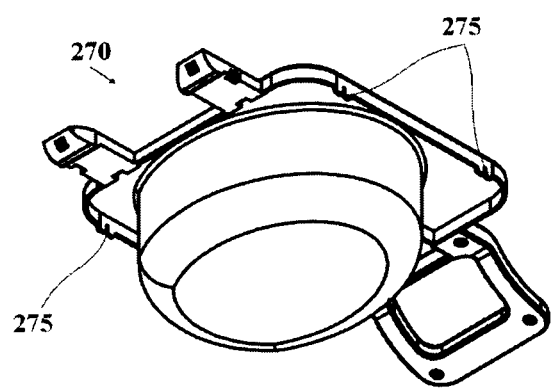
FIG. 13 is a bottom view of the toilet receptacle.

Reference is now made to FIG. 13, presenting the toilet receptacle 260 which is provided with ears 265 configured for fixating the toilet arrangement 270 to the wheel chair (not shown).

Figure 14A:
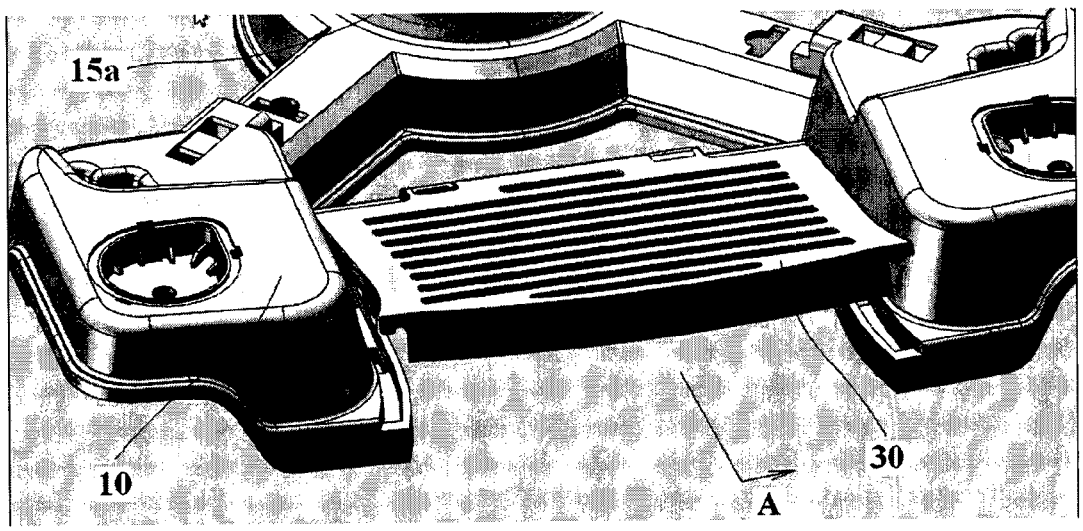
FIG. 14a is an enlarged front view of a of the trolley.

Reference is now made to FIG. 14a, presenting an enlarged front view of the trolley which is provided with a footboard 30 adapted for ascending and descending according to a need of a user or medical personnel during sitting down or standing up of the user. FIG. 14a shows a transport position of the footboard 30 when the feet of the user are supported by the footboard 30.

Figure 14B:
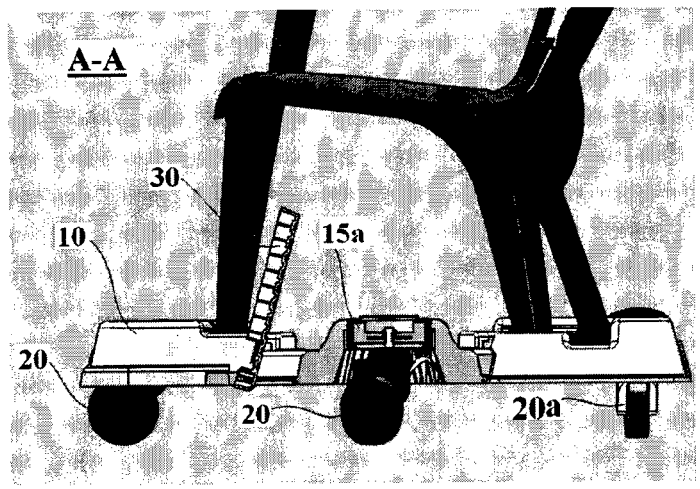
FIG. 14b is a cross sectional view of a of the trolley.

Reference is now made to FIG. 14b, presenting a cross sectional view of the trolley. The footboard 30 is in a position which provides convenience of sitting down or standing up of the user. In this position, the footboard 30 is drawn upward. In this position, the footboard does not bar the user from placing user's foot on a floor in front of trolley in convenience for the user.

The central portion 15 of the trolley is provided with an additional wheel 20 in order to improve an operational capability of the trolley.

In accordance with one embodiment of current invention, a trolley for transporting individuals of limited capacity in a sedentary position on a chair. The aforesaid trolley comprises (a) a carrying structure and (b) at least three wheels rotatably secured to the structure within a perimeter thereof.

It is a main innovation to provide the carrying structure configured for releasably fixating legs of the chair such that the chair is reversibly mountable on the carrying structure.

In accordance with another embodiment of current invention, chair seat and back support are upholstered with a water-proof material.

In accordance with a further embodiment of current invention, the trolley has following dimensional specifications: a length ranged between about 110 and about 120 cm;

a width ranged between about 75 and about 85 cm; and a height ranged between about 10 and about 30 cm.

In accordance with a further embodiment of current invention, the carrying structure further comprises a holder adapted to hold an object selected from the group consisting of an infusion bag, an oxygen balloon, a basket, a medical monitor, a sunshade, and any combination thereof.

In accordance with a further embodiment of current invention, the medical monitor is adapted to sense at least one user's parameter selected from the group consisting of heart electrical activity, breath activity, heart beat, blood pressure, haematological parameters and combination thereof.

In accordance with a further embodiment of current invention, the monitor is adapted to sense said haematological parameters noninvasively.

In accordance with a further embodiment of current invention, the trolley is configured as a mobility-aiding device.

In accordance with a further embodiment of current invention, the trolley comprises propelling means further comprising (a) a motor; (b) a wheel for contacting the ground, the wheel mechanically connected to the motor; and (c) controlling means adapted to translate user's steering commands.

In accordance with a further embodiment of current invention, the propelling means is rotatably mounted onto the trolley such that a direction of trolley movement is controlled by rotation of the propelling means.

In accordance with a further embodiment of current invention, the propelling means is mounted onto the trolley in a geometrical center thereof.

In accordance with a further embodiment of current invention, the trolley is provided with a handle adapted for manually pushing/tugging thereof.

In accordance with a further embodiment of current invention, the chair legs are releasably fixated by fixating means selected from the group consisting of a spring catch, a clamp, a clip, a lock, a grasp, a gripper, a latch, a cleat, a lug, a fixture, a holdfast, a jam, a nip, a checker, a fastener, and any combination thereof.

In accordance with a further embodiment of current invention, the trolley is made of a metal alloy, wood, a polymeric material, and any combination thereof.

In accordance with a further embodiment of current invention, the trolley is transparent to X-rays.

In accordance with a further embodiment of current invention, the trolley comprises predetermined modules. The modules are adapted to be assembled or disassembled manually at the site of use.

In accordance with a further embodiment of current invention, the constituent parts are coupled to each other by means for releasably locking selected from the group consisting of catch, a clamp, a clip, a lock, a grasp, a gripper, a latch, a cleat, a lug, a fixture, a holdfast, a jam, a nip, a checker, a fastener, and any combination thereof.

In accordance with a further embodiment of current invention, a wheel chair for facilitating life-sustaining activity of individuals of limited capacity is disclosed. The aforesaid chair comprises (a) a trolley further comprising (i) a carrying structure; and (ii) wheels rotatably secured to the structure; (b) a chair structure having a seat and a back support.

It is a main innovation of the invention to provide the chair structure releasably secured to the carrying structure.

In accordance with a further embodiment of current invention, the wheel chair is provided with toilet means adapted to receiving, storing, transporting and decomposing a fecal matter.

In accordance with a further embodiment of current invention, a method of facilitating life-sustaining activity of individuals of limited capacity is disclosed. The aforesaid method comprises the steps of: (a) providing a trolley for transporting individuals of limited capacity in a sedentary position on a chair further comprising: (i) a carrying structure and (ii) at least three wheels rotatably secured to the structure within a perimeter thereof; the carrying structure is configured for releasably fixating legs of the chair such that the chair is reversibly mountable on the carrying structure; (b) providing a chair; (c) mounting the chair onto the trolley; (d) releasably fixating the chair legs within spring catches; (e) placing the individual onto the chair; and (f) facilitating life-sustaining activity of the individual.

In accordance with a further embodiment of current invention, the step of facilitating life-sustaining activity further comprises transporting said individuals to an object of interest, outing, performing medical tests, including X-ray examination, hygienic procedures, including toilet, and any combination thereof.

In accordance with a further embodiment of current invention, the chair provided at the step (b) characterized by seat and back support upholstered with a water-proof material.

In accordance with a further embodiment of current invention, the carrying structure is provided with a holder adapted to hold an object selected from the group consisting of an infusion bag, an oxygen balloon, a basket, a medical monitor, a sunshade, and any combination thereof.

In accordance with a further embodiment of current invention, the medical monitor is adapted to sense at least one user's parameter selected from the group consisting of heart electrical activity, breath activity, heart beat, blood pressure, haematological parameters and any combination thereof.

In accordance with a further embodiment of current invention, the provided trolley is configured as a mobility-aiding device.

In accordance with a further embodiment of current invention, the trolley is provided with propelling means which comprises (a) a motor; (b) a wheel for contacting the ground, the wheel mechanically connected to the motor; and (c) controlling means adapted to translate user's steering commands.

In accordance with a further embodiment of current invention, the motor is electrical.

In accordance with a further embodiment of current invention, the motor is driven by compressed fluid.

In accordance with a further embodiment of current invention, the said trolley is provided with propelling means which is rotatably mounted onto the trolley such that a direction of trolley movement is controlled by rotation of the propelling means.

In accordance with a further embodiment of current invention, the trolley is provided with the propelling means mounted onto the trolley in a geometrical center thereof.

In accordance with a further embodiment of current invention, the trolley is provided with a handle adapted for manually pushing/tugging thereof.

In accordance with a further embodiment of current invention, the chair legs are releasably fixated by fixating means selected from the group consisting of a catch, a clamp, a clip, a lock, a grasp, a gripper, a latch, a cleat, a lug, a fixture, a holdfast, a jam, a nip, a checker, a fastener, and any combination thereof.

In accordance with a further embodiment of current invention, the trolley is made of a metal alloy, wood, a polymeric material, and any combination thereof.

In accordance with a further embodiment of current invention, the provided trolley is transparent to X-rays.

In accordance with a further embodiment of current invention, the predetermined modules, said modules adapted to be assembled or disassembled manually at the site of use.

In accordance with a further embodiment of current invention, the constituent parts are coupled to each other by means for releasably locking selected from the group consisting of a catch, a clamp, a clip, a lock, a grasp, a gripper, a latch, a cleat, a lug, a fixture, a holdfast, a jam, a nip, a checker, a fastener, and any combination thereof.

The invention claimed is:

1. A trolley for transporting a chair, said trolley comprising:
   (a) a carrying structure having a central part with four portions extending therefrom to define an "X" that is fixed in shape, each of the four portions having a recess adapted to receive a chair leg of the chair;
   (b) at least three wheels rotatably secured to at least three of the four portions of said structure; and
   (c) a steering column extending upward from said carrying structure.

2. The trolley according to claim 1, having following dimensional specifications: a length ranged between about 110 and about 120 cm; and a width ranged between about 75 and about 85 cm.

3. The trolley according to claim 1, wherein said carrying structure further comprises a holder adapted to hold an object selected from the group consisting of a food tray, an infusion bag, an oxygen balloon, a medical monitor, a basket, a sunshade, and any combination thereof.

4. The trolley according to claim 3, wherein said medical monitor is present and adapted to sense at least one user's para er selected from the group consisting of heart electrical activity, breath activity, heart beat, blood pressure, haematological parameters and combination thereof.

5. The trolley according to claim 3, wherein said medical monitor is present and adapted to sense said haematological parameters noninvasively.

6. The trolley according to claim 1, wherein said carrying structure is configured as a mobility-aiding device for an individual of limited capacity in the chair.

7. The trolley according to claim 6, wherein said carrying structure is configured as a walking frame.

8. The trolley according to claim 1, comprising a propelling system comprising:
   (a) a motor;
   (b) a wheel for contacting the ground, said wheel mechanically connected to said motor; and
   (c) a controller adapted to translate user's steering commands.

9. The trolley according to claim 8, wherein said motor is electrical and is provided with an electromagnetically controlled clutch.

10. The trolley according to claim 8, wherein said motor is driven by compressed fluid.

11. The trolley according to claim 8, wherein said propelling system is rotatably mounted onto said trolley such that a direction of trolley movement is controlled by rotation of said motor.

12. The trolley according to claim 8, wherein said propelling system is mounted onto said trolley in a geometrical center thereof.

13. The trolley according to claim 1 further comprising a handle adapted for manually pushing/tugging thereof.

14. The trolley according to claim 1, wherein said carrying structure is made of a metal alloy, wood, a polymeric material, and or any combination thereof.

15. The trolley according to claim 1, wherein said carrying structure is transparent to X-rays.

16. The trolley according to claim 1, wherein said carrying structure is formed from predetermined modules, said modules adapted to be assembled or disassembled manually at the site of use.

17. The trolley according to claim 16, wherein said predetermined modules are coupled to each other by means for releasably locking selected from the group consisting of catch, a clamp, a clip, a lock, a latch, a lug, and any combination thereof.

18. The trolley according to claim 8, further comprising a coupler adapted for coupling, towing or pushing a plurality of trolleys in sequence with the trolley.

* * * * *